US005870744A

United States Patent [19]
Sprague

[11] Patent Number: 5,870,744
[45] Date of Patent: Feb. 9, 1999

[54] VIRTUAL PEOPLE NETWORKING

[75] Inventor: David L. Sprague, Palo Alto, Calif.

[73] Assignee: Intel Corporation, Santa Clara, Calif.

[21] Appl. No.: 885,143

[22] Filed: Jun. 30, 1997

[51] Int. Cl.⁶ .................................................... G06P 17/30
[52] U.S. Cl. ............................... 707/9; 707/10; 707/104;
395/200.36; 395/200.59; 379/89
[58] Field of Search .................................. 707/9, 10, 104,
707/201; 395/200.36, 200.57, 200.59; 379/89

[56] References Cited

U.S. PATENT DOCUMENTS

| | | |
|---|---|---|
| 4,914,586 | 4/1990 | Swinehart et al. . |
| 5,159,669 | 10/1992 | Trigg et al. . |
| 5,442,786 | 8/1995 | Bowen . |
| 5,513,126 | 4/1996 | Harkins et al. . |
| 5,537,586 | 7/1996 | Amram et al. . |
| 5,539,665 | 7/1996 | Lamming et al. . |
| 5,664,126 | 9/1997 | Hirakawa et al. ..................... 345/329 |
| 5,675,510 | 10/1997 | Coffey et al. ....................... 364/514 A |
| 5,712,979 | 1/1998 | Graber et al. ...................... 395/200.11 |
| 5,754,939 | 5/1998 | Herz et al. .............................. 455/4.2 |
| 5,778,367 | 7/1998 | Wesinger, Jr. et al. ................. 707/10 |

OTHER PUBLICATIONS

Mostafa et al. "A Multilevel Approach to Intelligent Information Filtering: Model, System and Evaluation" ACM Transactions on Information Systems, vol. 15, No. 4, pp. 368–399, Oct. 1997.

Hiraiwa et al. "Info–Plaza: A Social Information Filtering System for the World–Wide Web" IEEE, pp. 10–15, Jun. 1996.

Primary Examiner—Thomas G. Black
Assistant Examiner—Michael J. Wallace, Jr.
Attorney, Agent, or Firm—Blakely, Sokoloff, Taylor & Zafman LLP

[57] ABSTRACT

A virtual people networking allows multiple people working for the same organizational organization with similar interests to automatically interface with each other when any one of the people accesses any given one of multiple electronic sites provided through an intranet of the organization. A virtual people networking (VPN) module of the present invention is capable of residing in a storage element coupled to a processor running the VPN module in any one of the multiple systems interconnected within the electronic intra-organizational network. The VPN modules may also reside in a storage element coupled to a processor running the VPN module in a firewall system acting as a gateway between the organizational intranet and the Internet providing access to the World Wide Web (WWW).

36 Claims, 14 Drawing Sheets (VPN RELATED SITE DATABASE) 214

| RELATED SITE ADDRESS | USER ID |
|---|---|
| RELATED SITE ADDRESS | USER ID |
| RELATED SITE ADDRESS | USER ID |
| ⋮ | |
| RELATED SITE ADDRESS | USER ID |

240 ... 242

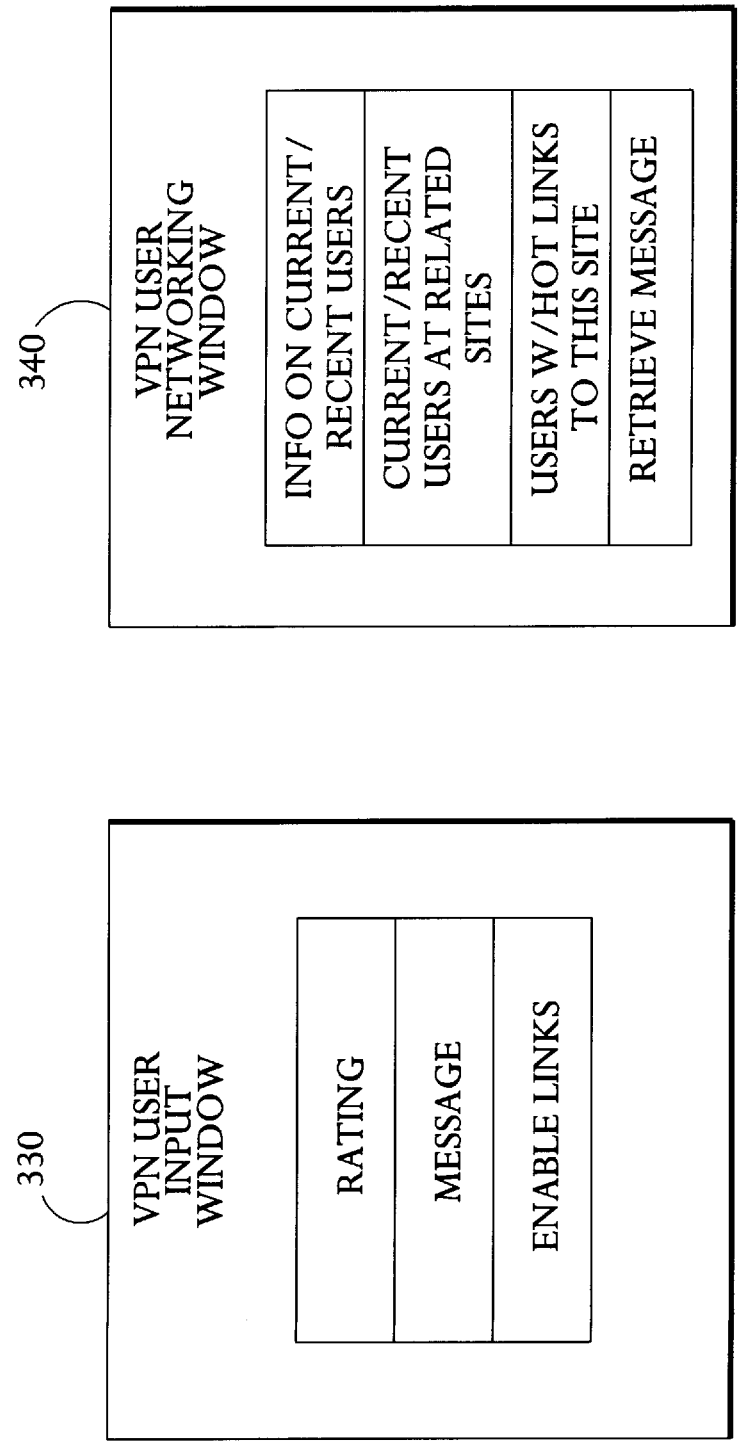

VIRTUAL PEOPLE NETWORKING

BACKGROUND OF THE INVENTION (1) Field of the Invention

The field of the present invention is related to a method and an apparatus for local and wide area networks, more specifically to a method and an apparatus for virtual people networking through an intranet.

(2) Related Art

The Internet is a wide area network connecting thousands of disparate networks in industry, education, government and research. The Internet utilizes transmission control protocol/Internet protocol (TCP/IP) as a standard for transmitting information. An intranet is a local area network supporting a single organization such as a company. Through an intranet, users may transmit messages to other users through electronic mail (e-mail) and browse web pages. In business, the use of e-mail is becoming the preferred mode of communication amongst employees in a corporation.

With the increase in the number of employees in a corporation using an intranet to communicate with other employees and to search for information from various electronic web sites, an opportunity for potentially meaningful and productive work related interaction amongst employees arises. To promote interaction amongst employees, it is desirable to make certain user access information on employees available. It is therefore desirable to have a method and an apparatus for a user connected to an intranet to accumulate information on other users connected to the same network and to access information allowing employees of the same corporation to network with the other employees and to remotely participate in group projects.

BRIEF SUMMARY OF THE INVENTION

A method and an apparatus for virtual people networking (VPN) updates a VPN user descriptor database with a VPN user descriptor corresponding to any one of a multiple of electronic subscribers to an electronic site. The VPN user descriptor of an electronic subscriber is accessible by present and preceding electronic subscribers. Entries in the VPN descriptor database having a subscriber site access history indicative of an access pattern of the present and preceding electronic subscribers are selected and provided to the present and preceding electronic subscribers upon request.

BRIEF DESCRIPTION OF THE DRAWINGS

FIG. 3d is an exemplary VPN user input window displayed in response to a user selection of the user input entry from the VPN menu illustrated in FIG. 3a.

FIG. 3e illustrates an exemplary VPN user networking window displayed in response to a user selection of networking entry in the VPN menu illustrated in FIG. 3a.

DETAILED DESCRIPTION OF THE INVENTION

The present invention is a method and an apparatus for virtual people networking (VPN) through an electronic intra-organizational network (intranet) interconnecting computer systems capable of acting as both a client system as well as a server system for providing electronic sites accessible from any one of the computer systems. The present invention's virtual people networking (VPN) module allows multiple people working for the same organization with similar interests to automatically interface with each other when any one person accesses a given one of multiple electronic sites provided through the intranet.

The virtual people networking (VPN) module of the present invention is capable of residing in a storage element coupled to a processor running the VPN module in any one of the multiple systems interconnected within the electronic intra-organizational network. The VPN module may also reside in a storage element coupled to a processor running the VPN module or in a firewall system acting as a gateway between the electronic intra-organizational network and the Internet providing access to the World Wide Web (WWW) or some other network.

The VPN module updates a VPN user descriptor database with a VPN user descriptor and a real time access pattern corresponding to a given one of many electronic subscribers. An electronic subscriber as used herein refers to anyone having access to the intranet. In one embodiment, the VPN user descriptor describes subscriber identification information including user name, electronic mail address, department and group.

The updated entries in the VPN user descriptor database are accessible by any current and subsequent electronic subscribers accessing the same electronic site. The VPN user descriptor database is updated by a VPN monitor which monitors and records the real time access pattern of each electronic subscriber. The real time access pattern is also referred herein as subscriber site access history.

Upon request of any electronic subscriber at a given electronic site, a VPN selector selects a VPN user descriptor entry in the VPN user descriptor database which is indicative of frequent and similar access pattern as compared to the requesting electronic subscriber. The VPN descriptor database is coupled to the VPN monitor and the VPN selector of the present invention's VPN module.

Figure 1:
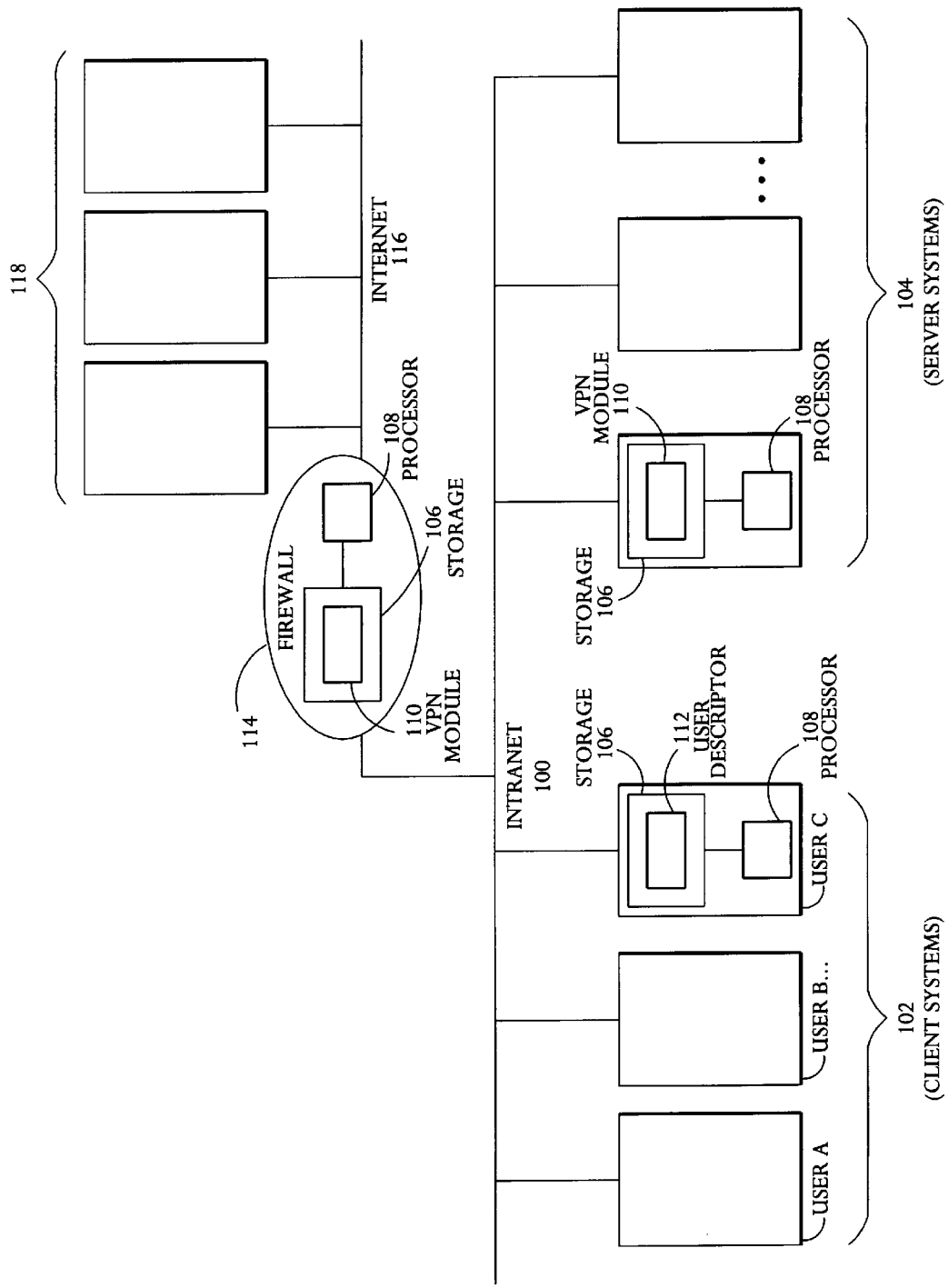
FIG. 1 illustrates the present invention's exemplary electronic intraorganizational network.

FIG. 1 illustrates the present invention's exemplary electronic intraorganizational network (intranet). Intranet 100 interconnects multiple computer systems. In one embodiment, each computer system is capable of being a client 102 or a server 104. Each system also has a storage element 106 coupled to a processor 108. Further, the present invention's virtual people networking (VPN) module 110 may reside in any one of the client 102 or server system 104 hosting at least one web site. Each client system 102 may also have a VPN user descriptor 112 residing in storage element 106 coupled to processor 108.

Intranet 100 is ultimately coupled to a firewall system 114 also having a storage element 106 coupled to a processor 108. The firewall system is the system for the network administrator of the organization monitoring/filtering incoming as well as outgoing electronic information in between the intranet 100 and Internet 116. Firewall system 114 has VPN module 110 for monitoring user access to web sites located through Internet 116 from intranet 100.

As mentioned previously, the present invention's VPN module provides a platform on which any electronic subscriber within the intraorganizational network (intranet 100) may automatically be gathered into a group and may have contact with other members within the group having similar interests as is gauged through each user's real time site access pattern as well as their user descriptor.

The automatic networking amongst people having similar interests promotes increased productivity and decreased time in administrative steps taken to seek and contact those of similar interests within an organization.

Figure 2A:
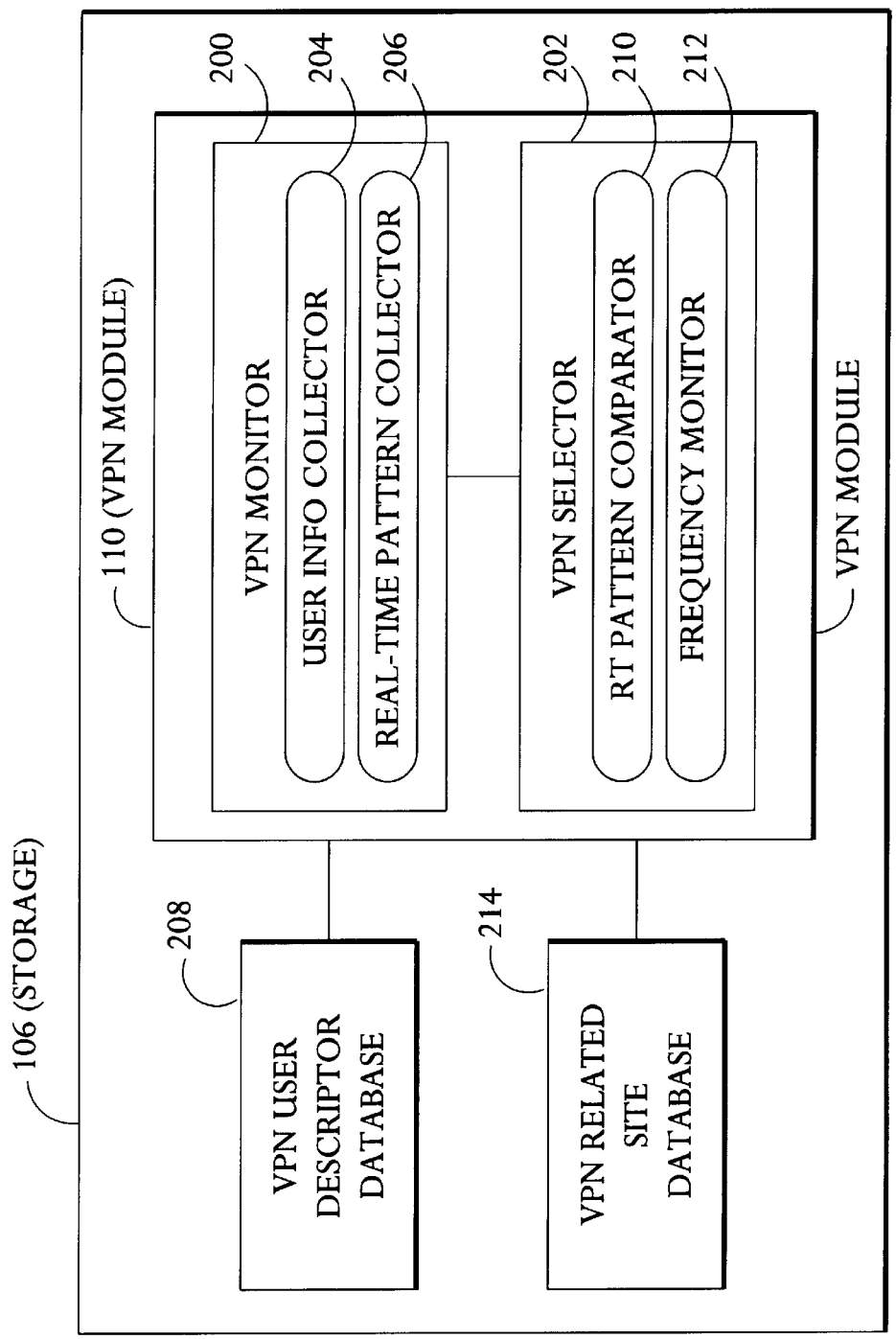
FIG. 2a illustrates an exemplary storage element having several elements of the present invention.

FIG. 2a illustrates an exemplary storage element 106 as illustrated in FIG. 1 having several elements of the present invention. VPN module 110 has a VPN monitor 200 coupled to a VPN selector 202. VPN monitor monitors and records the user descriptors as well as the real time access pattern of each electronic subscribers accessing electronic sites in the electronic intra-organizational network. The VPN monitor 200 has a user information collector 204 coupled to a real time pattern collector 206. The user information collector 204 prompts a user for their user descriptor if not automatically available in a user VPN descriptor database. The real time pattern collector 206 updates the VPN user descriptor database 208 of site access pattern history for each electronic subscriber as they are performing their respective activities at their given electronic site. VPN descriptor database 208 may exist as one database supporting the entire intranet. In a preferred embodiment, there is one VPN descriptor database 208 for each electronic site on the intranet.

In one embodiment, the VPN user descriptor database 208 also has for each entry an input of the rating of the respective electronic subscriber has given to a particular electronic site as well as a current site flag indicating whether or not the electronic subscriber is at that electronic site at the current time. Additionally the VPN user descriptor database 208 has for each entry a time stamp indicating when the last time a user has accessed that given site.

The VPN selector 202 selects an entry from the VPN user descriptor database 208 which has similar site access pattern history as an electronic subscriber requesting such information for a particular electronic site. The VPN selector 202 has a real time pattern comparator 210 coupled to a frequency monitor 212. A real time pattern comparator 210 compares each entry in the VPN user descriptor database 208's site access pattern history against the electronic subscriber requesting the information and retrieves the entry or entries (depending on how many entries the electronic subscriber requested) which is or are the most similar to the site electronic access pattern of the requesting electronic subscriber. The frequency monitor 212 monitors the frequency with which each electronic subscriber accesses a given electronic site and related electronic sites accessible through hyper links available from the given electronic site.

The VPN related site database 214 stores a list of electronic sites within the intranet related to a given site and is linked to such given site. The VPN related site database 214 is updated each time a user or electronic subscriber creates a new hot link from a given site to a related site either on their own system file or to another remote system file. The method for creating hot links is well known in the art and requires no further discussion. Both VPN user descriptor database 208 and VPN related site database 214 may reside on any system on the intranet.

Figure 2B:
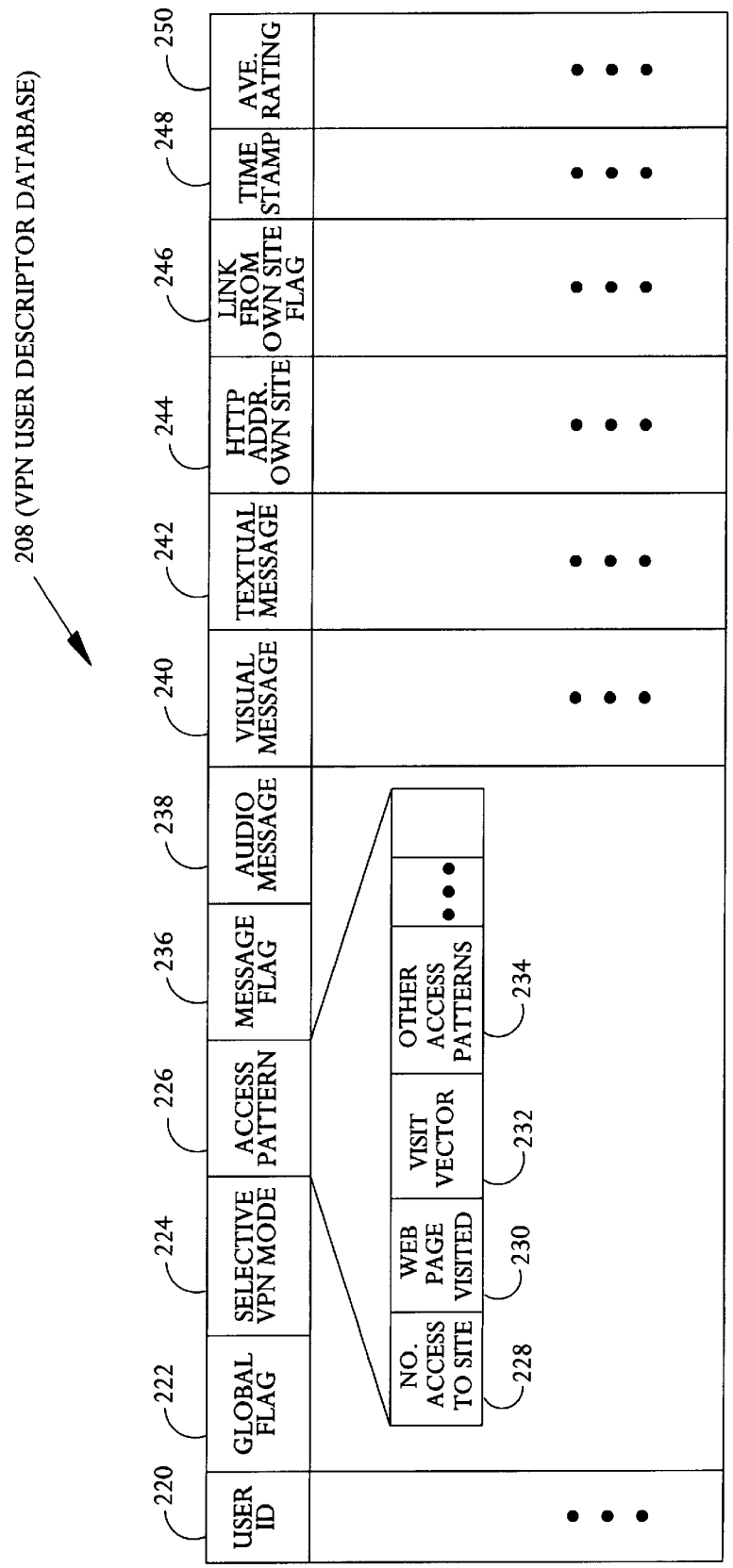
FIG. 2b illustrates an exemplary Virtual People Networking (VPN) user descriptor database.

FIG. 2b illustrates an exemplary VPN user descriptor database. The VPN module of the present invention creates a VPN user descriptor database 208 associated with each web site on the client or server systems. The database is listed with users currently at the associated electronic site followed by users most recently at the site as indicated by each of the user's timestamp. The database is reordered every time a new timestamp entry is made.

In one embodiment, the exemplary VPN user descriptor database 208 has user identification 220 identifying the user at the electronic site corresponding to VPN user descriptor database 208, global flag 222 indicating whether the user wants the VPN mode on for the remainder of his/her network session, selective VPN mode 224 which is enabled when the user only wants the VPN mode on for the electronic site initially displayed, access pattern 226 including number of access 228 to the given site by the specific user identified by the user identification, web page visited 230 by user, visit vector 232 and other access pattern 234.

VPN user descriptor database 208 further has message flag 236 to indicate whether the user has left a message at the given site, audio message 238 and fields visual message 240 and textual message 242 indicating the type of message left by the user. Additionally, VPN user descriptor database 208 has the hyper text transfer protocol (http) address to the user's own site 244, a flag 246 indicating whether there is a link from the user's site to the given site, time stamp 248 indicating when the last most recent visit to the given electronic site was by the user and the average rating 250 given by the user of the given site.

Figures 2C, 3A:
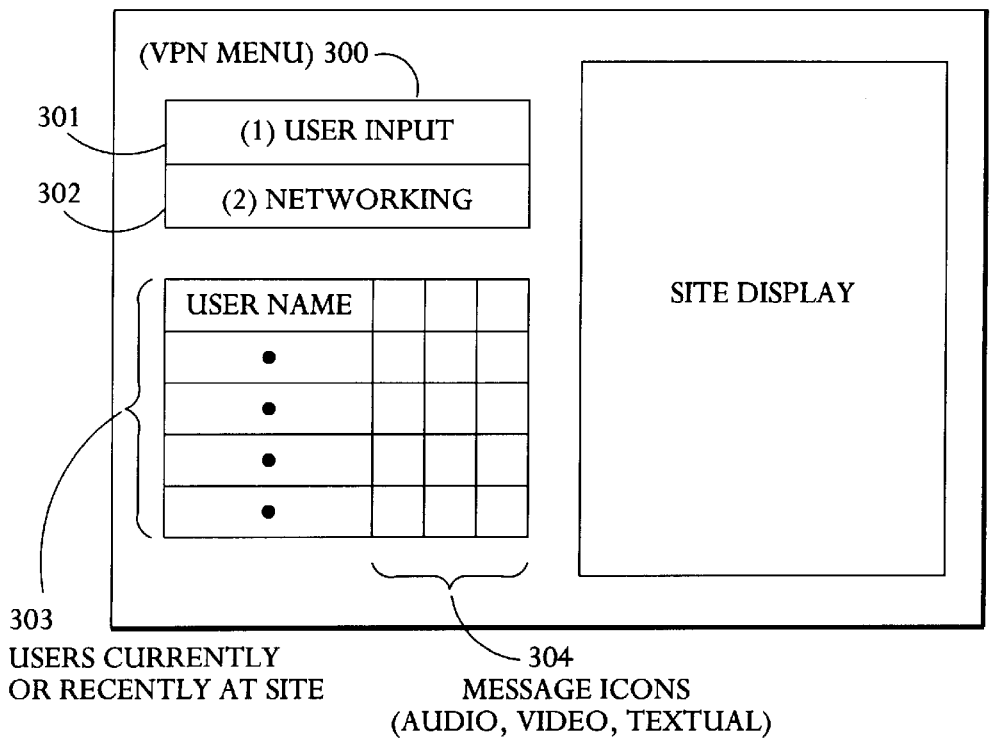
FIG. 2c illustrates an exemplary VPN related site database.
FIG. 3a illustrates the present invention's VPN menu to be displayed at any one of the systems in the intranet.

FIG. 2c illustrates an exemplary VPN related site database. VPN related site database 214 has related site address 240 and the corresponding user identification (ID) 242.

FIG. 3a illustrates an exemplary display to be displayed at any one of the systems in the intranet as illustrated in FIG. 1 after an electronic subscriber gains access to a site and agrees to initiate the present invention's virtual people networking (VPN) mode. Once the user agrees to initiate the VPN mode, a VPN menu 300 appears on the screen alongside with the displayed site. An exemplary VPN menu 300 includes a user input entry 301 as well as a networking entry 302.

The display also has list 303 with a predetermined number of users currently or recently at site as copied from the VPN user descriptor database of the electronic site along with message icons 304 indicating whether any audio, video or textual messages have been left by any of the users on list 303.

Figure 3C:
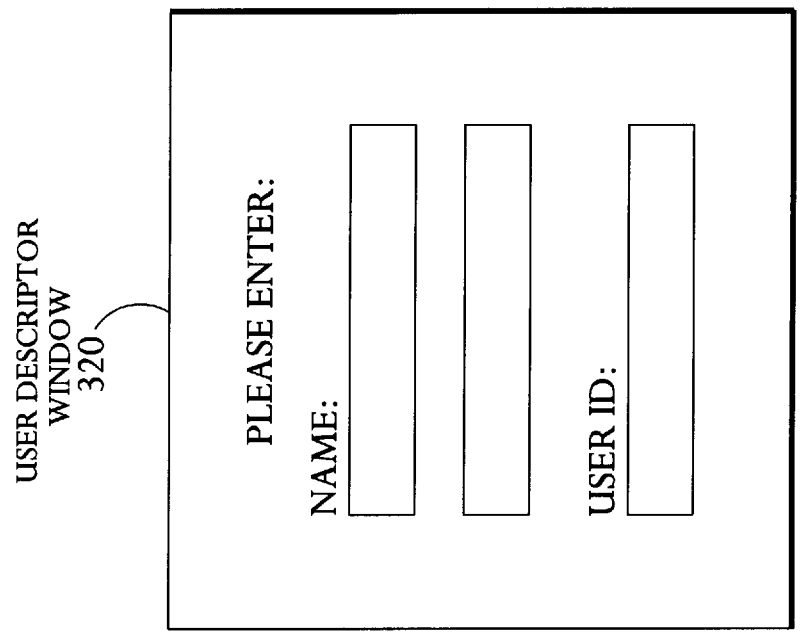
FIG. 3c illustrates an exemplary user descriptor window prompting a user to input information regarding him or herself.
Figure 3B:
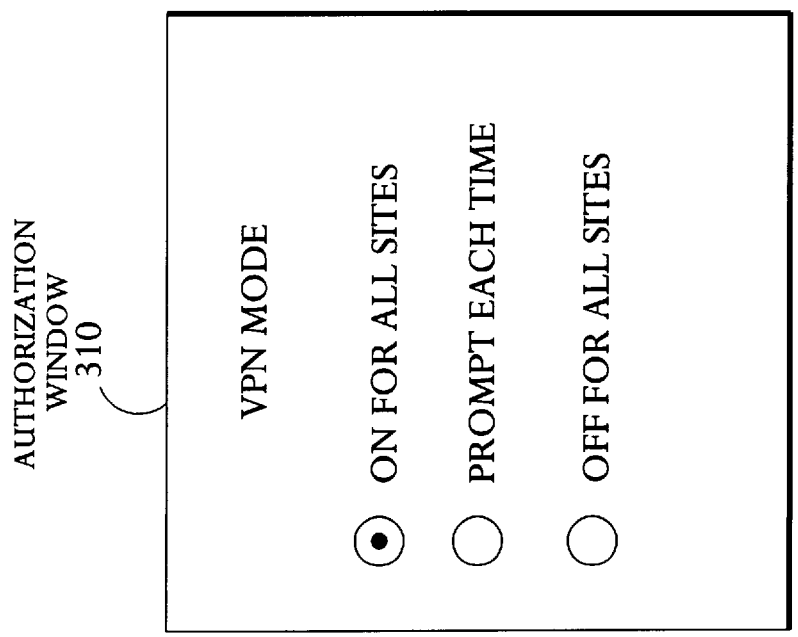
FIG. 3b illustrates the present invention's exemplary authorization window requesting user authorization to initiate the present invention's VPN mode.

FIG. 3b illustrates the present invention's exemplary authorization window 310 requesting user authorization to initiate the present invention's VPN mode.

FIG. 3c illustrates an exemplary user descriptor window 320 prompting a user to input information regarding him or herself.

FIG. 3d is an exemplary VPN user input window 330 displayed in response to a user selection of the user input entry from the VPN menu illustrated in FIG. 3a. The VPN user input window menu selection has an entry for the user to input his or her rating of the particular electronic site, a message entry allowing the user to leave audio, video or textural message for subsequent accesses of the electronic site and an entry for enabling links which allows a user to create hot links to or from the presently displayed electronic site to related files either on their own file system or at a remote file system.

FIG. 3e illustrates an exemplary VPN user networking window 340 displayed in response to a user selection of networking entry in the VPN menu illustrated in FIG. 3a. The VPN user networking window menu displays an entry for information on current and recent users of the currently displayed electronic site, information on users currently or recently at related electronic sites and information on users with hot links to the currently displayed electronic site.

Figure 4:
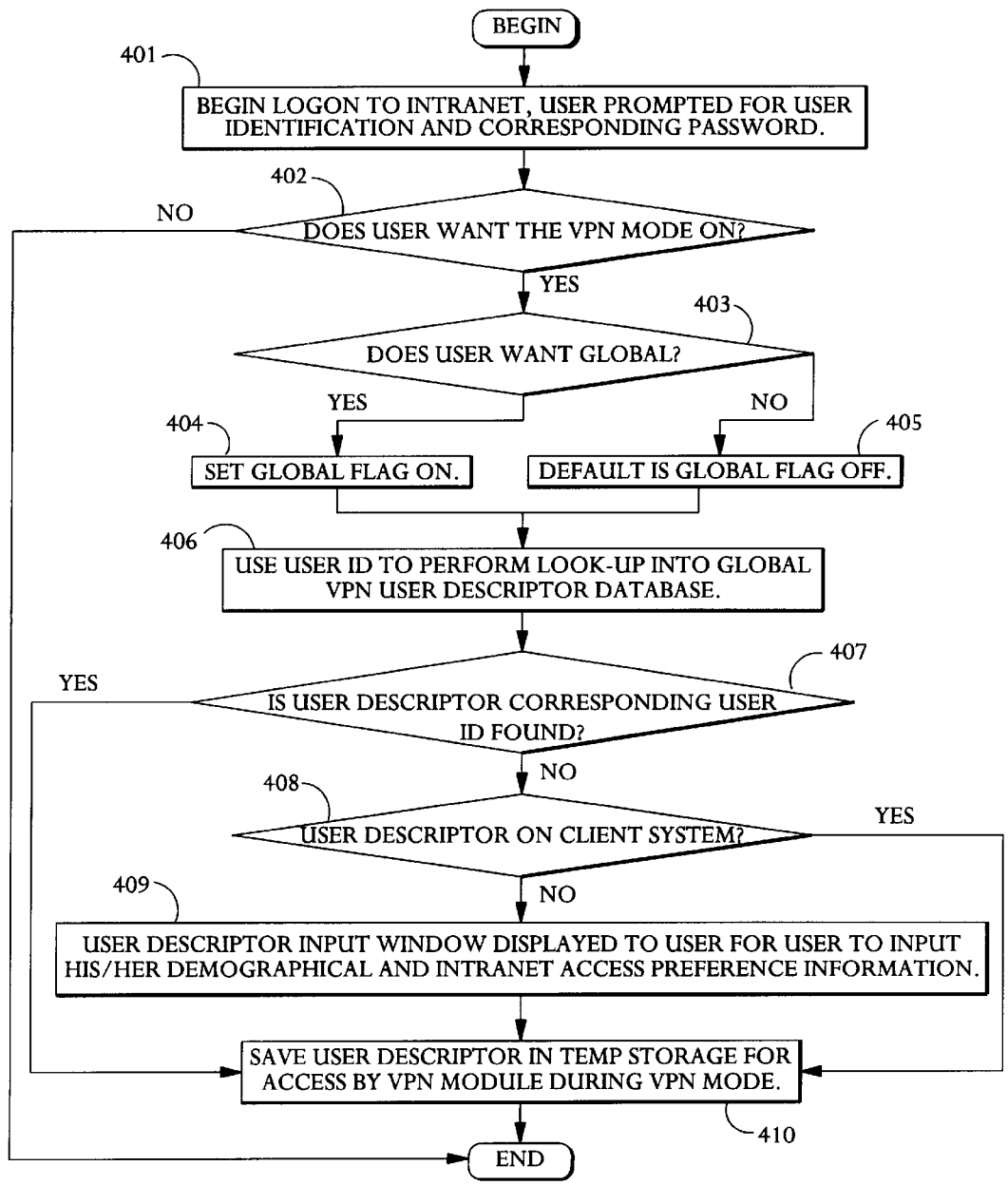
FIG. 4 illustrates the general steps followed by the present invention in initiating the VPN mode.

FIG. 4 illustrates the general steps of the present invention in initiating the VPN mode. In step 401, the user logs onto the intranet and is prompted for user identification and corresponding password by the VPN module. In step 402, the user is prompted whether or not he or she desires the VPN mode to be turned on. In step 403, if the user desires to have the VPN mode on, then the user is further requested whether he or she would like to have the VPN on for all the electronic sites to be accessed during the current session or whether he or she would like to be prompted at each electronic site visited during the session. In step 404, if the user desires the VPN mode for every electronic site visited during the session, then the global flag associated with the user in the user descriptor is set. Otherwise in step 405, the default is to set the selective VPN mode on and the global flag is off.

In step 406, the user identification received from the user at log on to the intranet is utilized to perform the look-up into the VPN user descriptor database of the site. In step 407, if a user descriptor corresponding to the user identification is found in the VPN user descriptor database, then the corresponding user descriptor entry's timestamp is updated to reflect the current time. Further, in step 410, the user identification is saved in the client system storage for access by the VPN module.

Otherwise in step 408, if the user descriptor is on the client system utilized by the user, then in step 410, the user descriptor is retrieved from the client system and saved in client system storage for access by the VPN module during VPN mode. If the user descriptor entry of the user is not found on the client system, then in step 409, the VPN monitor's user information collector displays the user descriptor input window to the user for the user to input his or her demographical and intranet access preference information. The information from the user is saved in the newly created user descriptor entry for the user and stored in the client system storage for access by the VPN module during VPN mode. In the corresponding entry in the VPN user descriptor database, the timestamp field is updated to reflect that the user is currently at the site.

Figure 5:
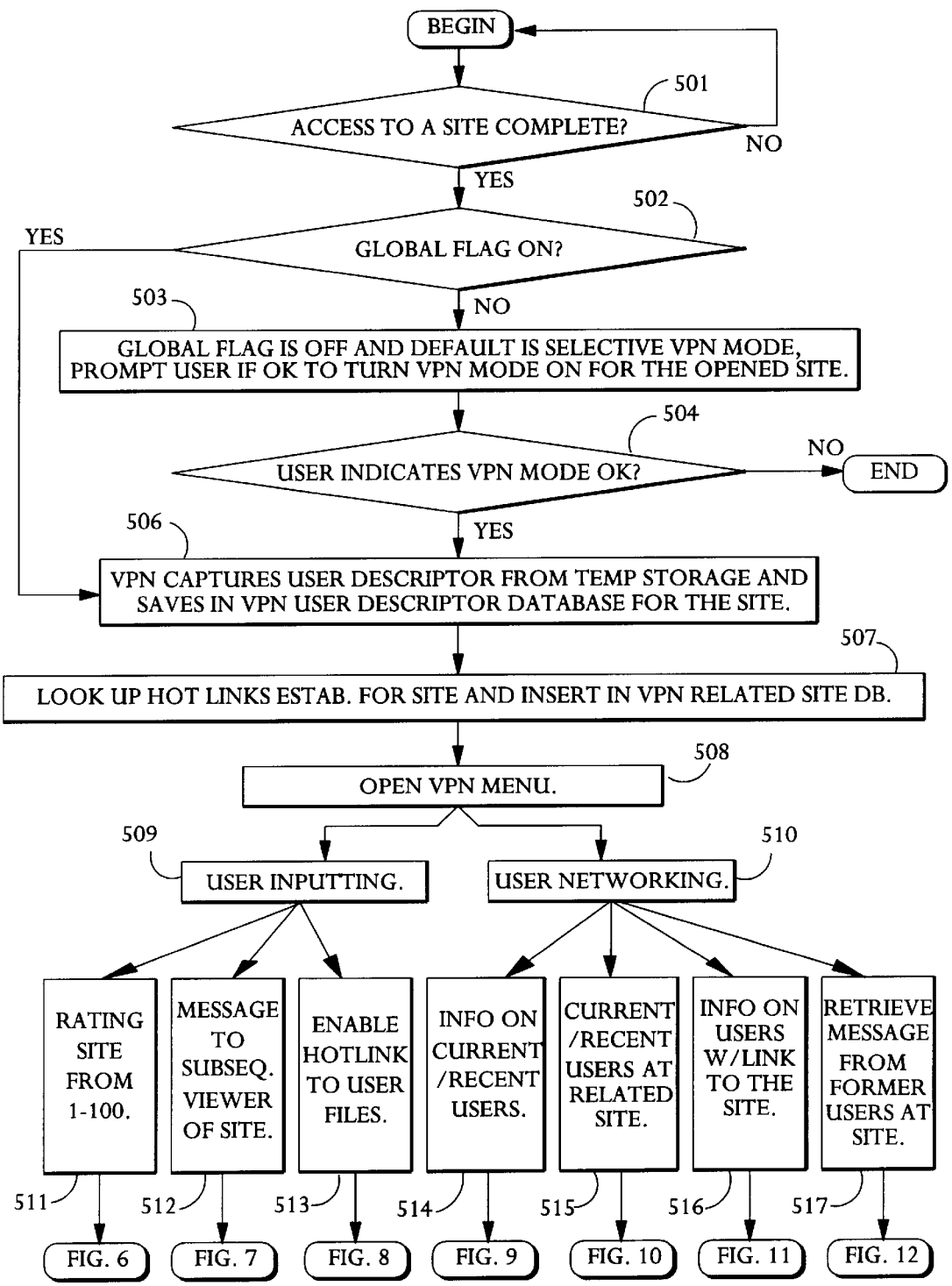
FIG. 5 illustrates the general steps followed by the present invention upon access to an electronic site by a user using conventional browser tools.

FIG. 5 illustrates the general steps of the present invention upon access to an electronic site by a user using conventional browser tools. A list in the VPN module in the firewall system is kept of all Internet sites visited including the number of times the site has been visited by all users. For a limited number of special sites, the names of those who visited those sites are also saved in the list. The selection of how to choose sites which will also hold the names of those who visited the sites may be determined by sites having a visitor count that is above a specified minimum number and below a maximum number. In step 501, once an access by a user to an electronic site is complete, a look up is made to the global flag corresponding to the user descriptor entry stored in a storage on the client system in step 502. If the global flag is not on, then in step 503, the default is selective VPN mode and a prompt is made to the user to determine whether to turn the VPN mode on for the displayed electronic site. In step 504, if the user requests the VPN mode to be turned on, then in step 506 the VPN module captures the user's user descriptor from the client system storage and saves the user descriptor in the VPN user descriptor database for the site.

In step 507, a look up is performed to the hot links established for the electronic site and the associated electronic site address is inserted in the VPN related site database. Hot links are links to sites other than the presently displayed site which previous visitors to the presently displayed site have indicated as having a topic related to this presently displayed site. In step 508, the VPN menu is opened for display to the user along with the presently displayed site. In one embodiment, the VPN menu options include user inputting (Box 509) and user networking (Box 510) options. Included under the user inputting entry menu options are ratings site from 1 to 100 option (Box 511), message to subsequent viewer of the site option (Box 512) and provide hot links to user files option (or to related sites) (Box 513). With the user inputting options, the user may input ratings of the electronic site from 1 to 100, leave a message in the form of audio, video or textual input for subsequent users of the electronic site and/or create hot links to their own files that may have related subject matter.

With the user networking 510 menu option, the user may retrieve information on current/recent users of the electronic site (Box 514), access information on current/recent users of related electronic sites (Box 515) and/or retrieve information on users with hot links to the electronic site (Box 516). The user networking entry also has an option allowing a user to retrieve messages (audio, video or textual) left at the electronic site (Box 517).

Figure 6:
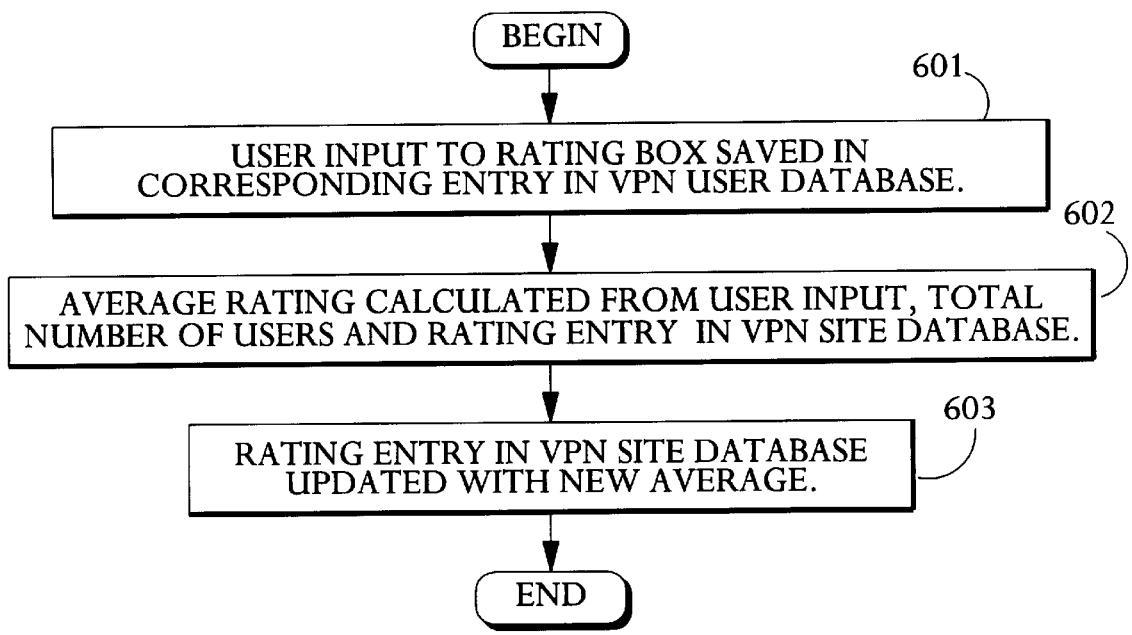
FIG. 6 is a flow diagram illustrating the general steps followed by the present invention in accepting and storing user rating of electronic sites.

FIG. 6 is a flow diagram illustrating the general steps of the present invention in accepting and storing user ratings of a given electronic site. In step 601, the user selects the rating site entry and the user inputting entry of the VPN menu and the VPN dialogs user to input rating of the electronic site. In step 602, an average rating entry is determined from the rating input by the user, the total number of ratings and the number of users inputting ratings. The average rating entry is then saved in the site's VPN user descriptor database entry for the user. In step 603, the rating entry in the site's VPN user descriptor database is then updated with the new average rating value.

Figure 7:
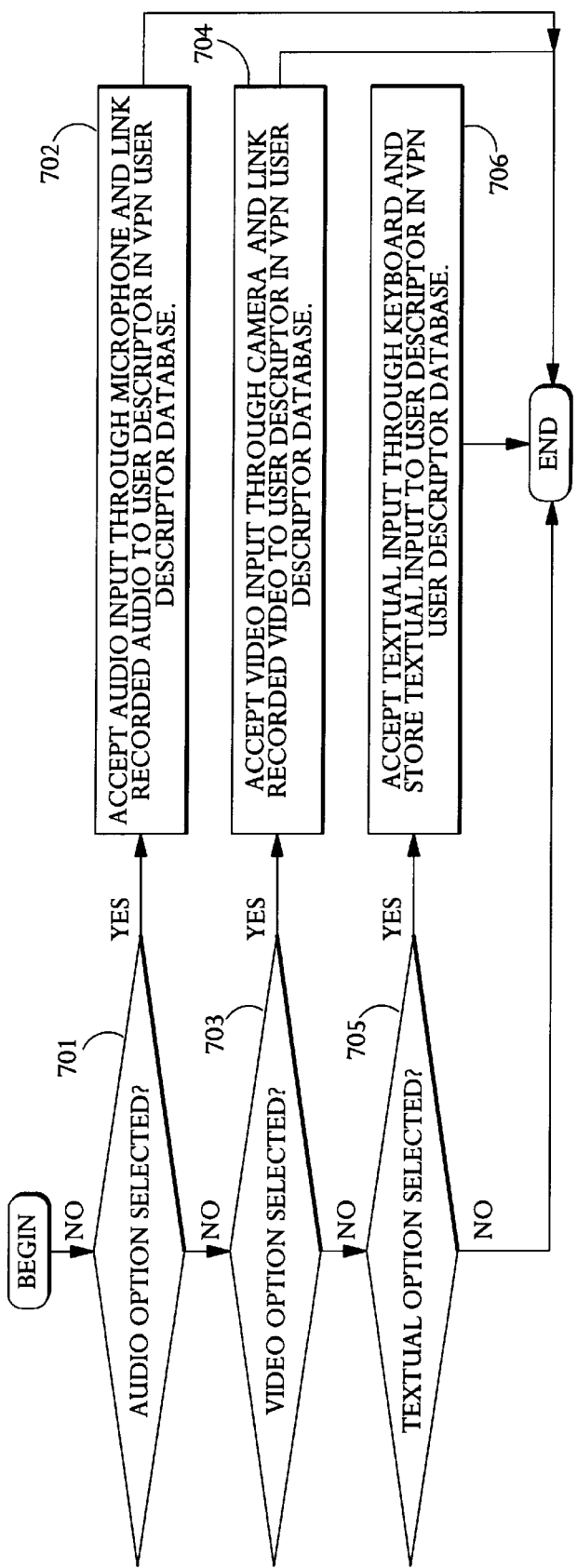
FIG. 7 is a flow diagram illustrating the general steps followed by the present invention in accepting audio, video and textual information from the user to be acquired by subsequent viewers of the electronic site.

FIG. 7 is a flow diagram illustrating the general steps of the present invention in accepting audio, video and textual information from the user for retrieval by subsequent users of the electronic site. In step 701, once a user selects the message to subsequent viewer of the electronic site option from the user inputting menu of the VPN menu, the VPN module prompts the user for message type including audio, video or textual option. If the user selects the audio option, then in step 702 the VPN module accepts audio through a microphone coupled to the computer system displaying the electronic sited being viewed by the user. The recorded audio is then linked to the user descriptor in the electronic site's VPN user descriptor database. A predetermined number of time limit may be given for each recording for each user such as 10 seconds of maximum audio recordable limit of time. If the user selects the video option in step 703, then in step 704, the VPN module accepts video input through a camera (not shown) coupled to the computer system and links the recorded video to the user's user descriptor entry in the electronic site's VPN user descriptor database for later viewing by subsequent users of the electronic site.

In step 705, if the textual option is selected by the user, then in step 706, the VPN module accepts textual input through the keyboard coupled to the client system and stores the textual input to the user's user descriptor entry in the electronic site's VPN user descriptor database. Information regarding experts in the subject that are covered by the particular electronic site may be left for subsequent viewers of the electronic site through this option.

Figure 8:
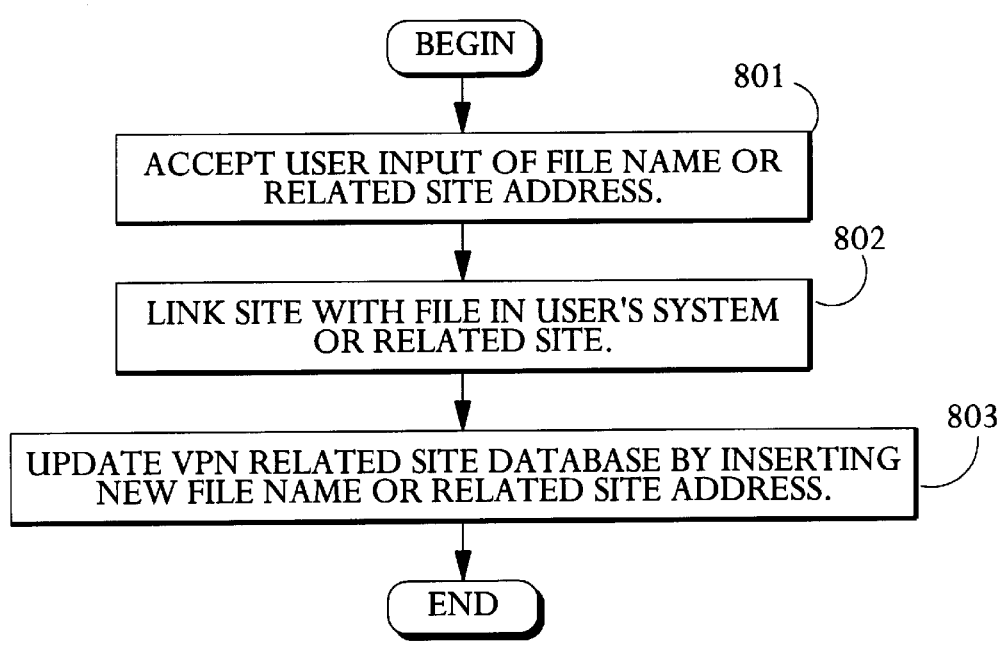
FIG. 8 is a flow diagram illustrating the general step followed by the present invention in allowing a user to enable hot links from an electronic site to their own files on their system.

FIG. 8 is a flow diagram illustrating the general step of the present invention in allowing a user to enable hot links to their own files on their client system from a given electronic site. In step 801, the VPN module dialogs the user to input the name of the file which the user desires to link to from the electronic site. The user may also input a site address for a related site which he or she has knowledge of. In step 802, the VPN module links the electronic site to a file in the user system or a related site. A link to a user's file assumes that the user has his or her own web site where the files may be referenced such that the user inputs the hypertext transfer protocol (HTTP) address of the file or web page at their own site or at another related site. Alternatively, if the user does not have a web site, the user may leave a link to their client system that another user can use to automatically send the user an e-mail message requesting a copy of a specified document. In step 803, the VPN related site database is updated by inserting the new file name or related site address as input by the user.

Figure 9:
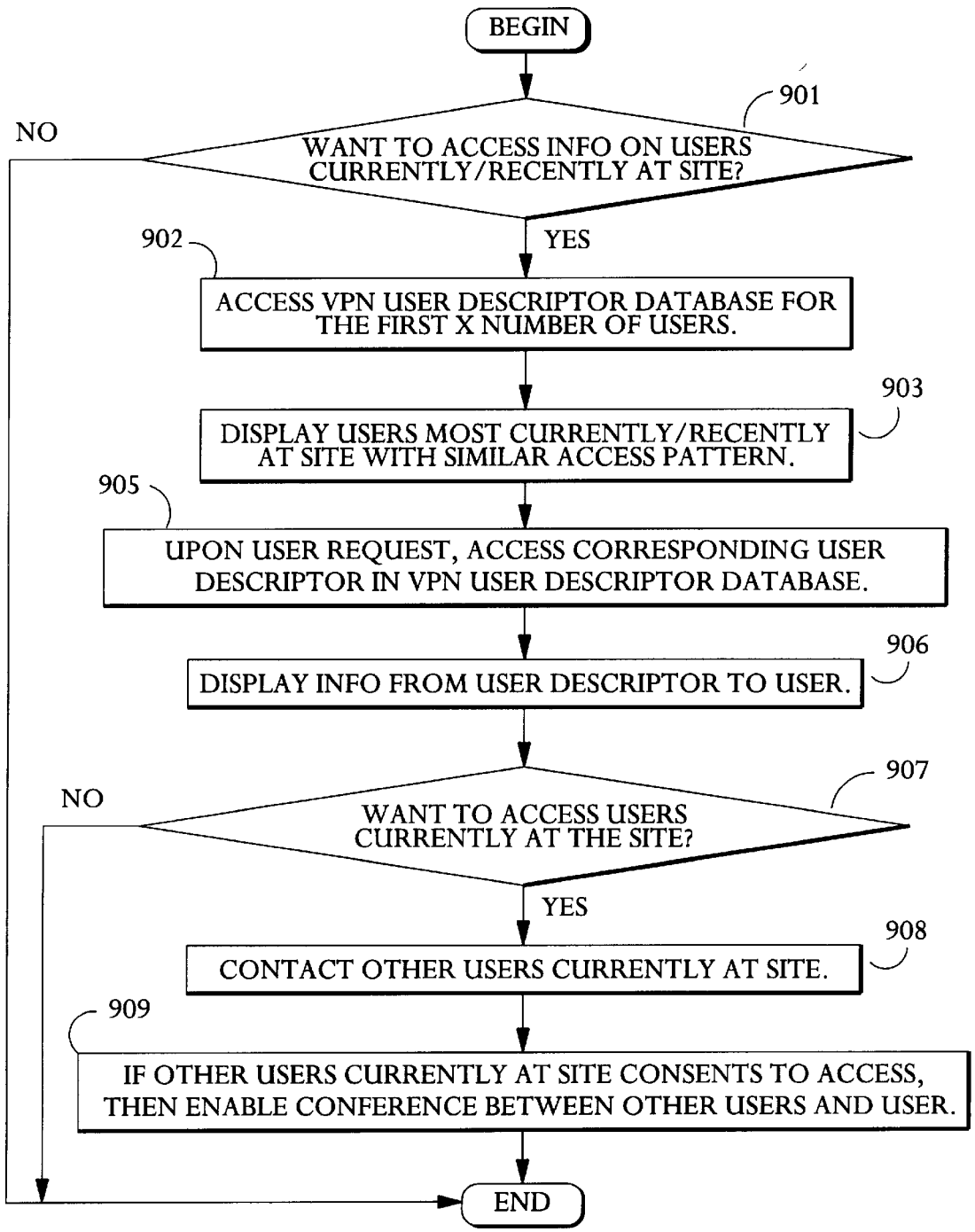
FIG. 9 is a flow diagram illustrating the general step followed by the present invention when a user selects the option to retrieve information regarding current and recent users of the electronic site under the user networking entry of the VPN menu.

FIG. 9 is a flow diagram illustrating the general steps of the present invention when a user selects the option to retrieve information regarding current/recent users of the electronic site under the user networking entry of the VPN menu. In step 901, a user is prompted on whether they would like to access information on users currently or recently at the currently displayed electronic site. In step 902, if the user desires to retrieve such information, the VPN module activates the VPN selector to retrieve a predetermined number of entries from the VPN user descriptor database associated with the electronic site. The entries to be retrieved are for current and recent users of electronic site with similar access patterns as the requesting user. In step 903, the user may also request to only access information on users currently at the site. The VPN selector then searches for entries in the VPN user descriptor database associated with the electronic site with a current at-site flag on. In step 903, the information on the user retrieved entries are displayed to the requesting user.

In step 904, upon the user request, the corresponding user descriptor entry in the VPN user descriptor database associated with the electronic site is also displayed to the user in step 906. In step 907, if the user decides to access users currently at the electronic site, then in step 908, the VPN module contacts other users currently at the site via pop-up window which is displayed on the other users' display device. For example, the Internet relay chat or other similar real-time chat facility which is currently implemented on some web sites may be used to provide real-time communication between the users. In step 909, if the other users currently at the electronic site consents to access, then the VPN module enables conference between other users and the requesting user by video, audio or textual conference. For audio or video communication, an Internet phone protocol or CUSeeMe video conferencing protocol may be utilized to connect users together.

Figure 10:
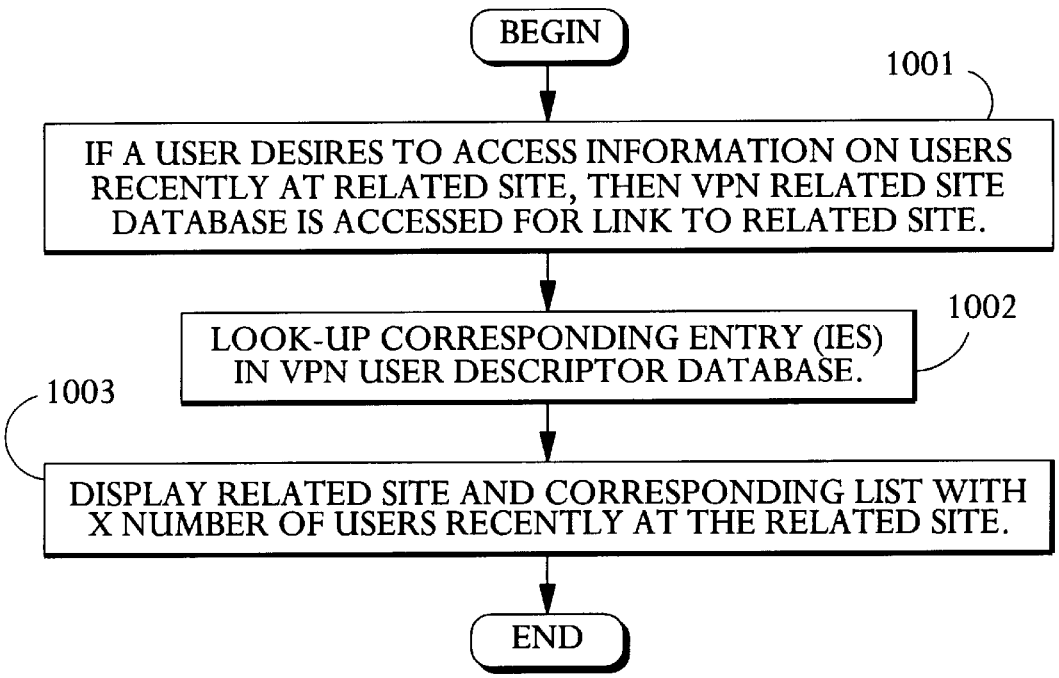
FIG. 10 is a flow diagram illustrating the general steps followed by the present invention when a user selects an option to access information on users recently at a related electronic site.

FIG. 10 is a flow diagram illustrating the general steps of the present invention when user requests access to find other users recently at a related electronic site. In step 1001, if a user desires to access information regarding other users recently at a related site, then the VPN related site database is accessed by the VPN module for a link to the related site. In step 1002, a look up is made to the VPN user descriptor database associated with the related site. In step 1003, the related site and the corresponding list of a predetermined number of users recently at the related site is displayed to the user. If a user desires to retrieve information on other recent visitors to sites related to the currently displayed site, then the user goes to one or more of the related sites and finds the VPN listing of recent users of that site.

Figure 11:
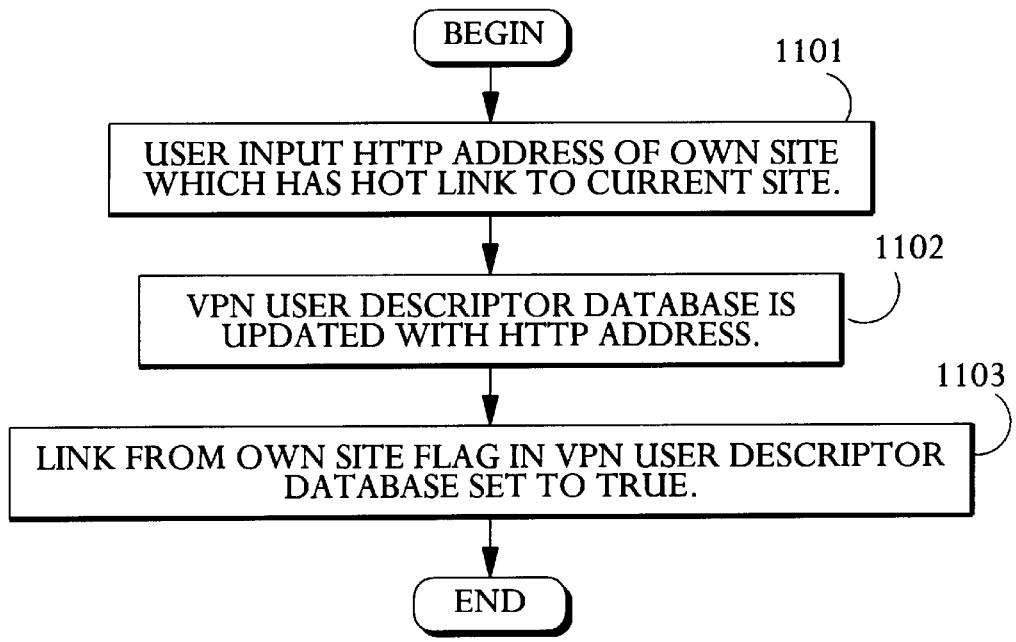
FIG. 11 is a flow diagram illustrating the general steps followed by the present invention in allowing a user to retrieve information on users with hot links to an electronic site.

FIG. 11 is a flow diagram illustrating the general steps followed by the present invention in allowing a user to retrieve information on users with hot links to the electronic site. In step 1101, a user provides the HTTP address to their own related sites. In step 1102, the HTTP address is saved in the currently displayed site's VPN user descriptor database. In step 1103, a flag (link from user's own site flag) is set to true indicating that the user has a hot link to the currently displayed site from their own web site.

Figure 12:
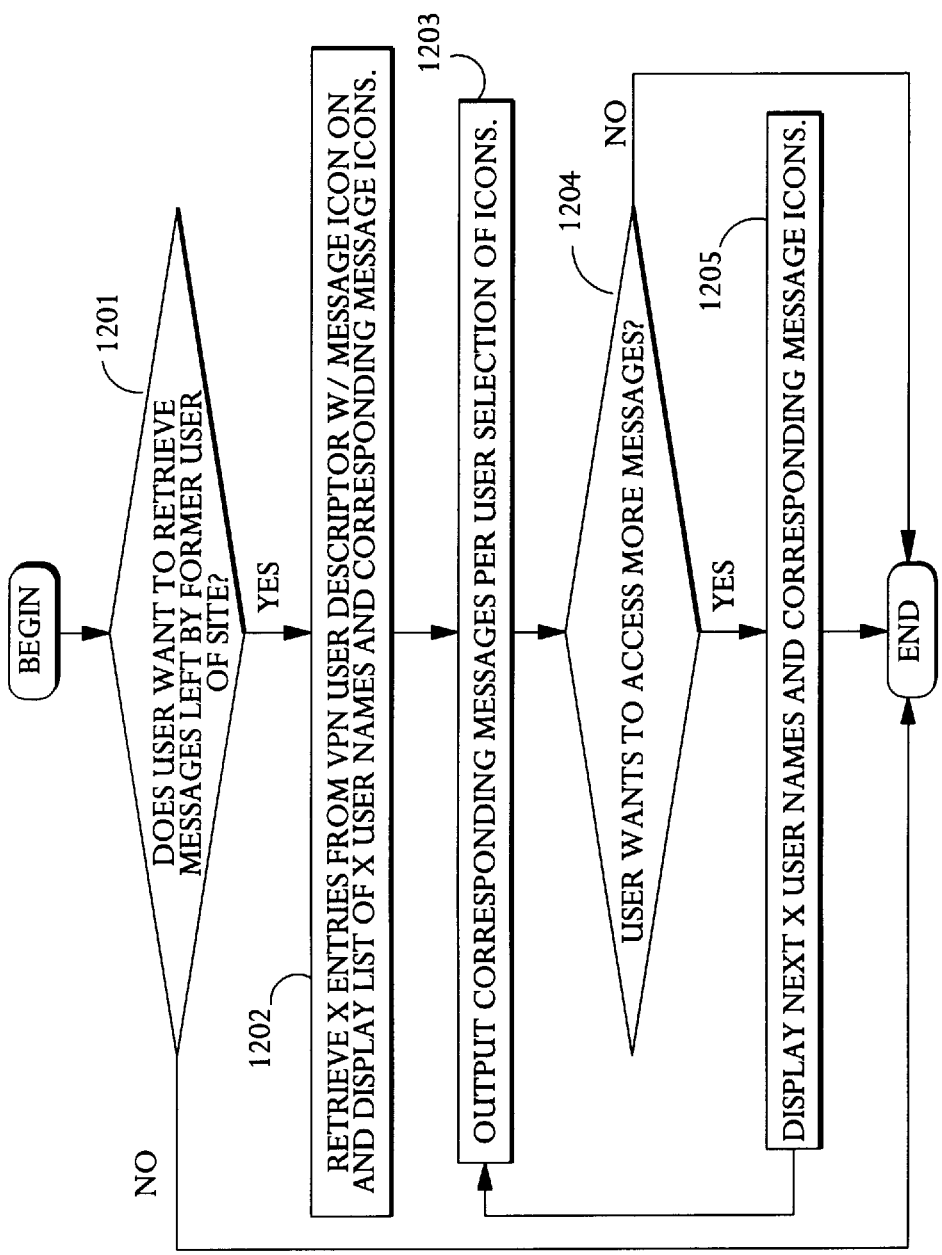
FIG. 12 is a flow diagram illustrating the general steps followed by the present invention in allowing a user to retrieve messages left by former users of an electronic site.

FIG. 12 is a flow diagram illustrating the general steps followed by the present invention in allowing a user to retrieve messages left by other users of the electronic site. In step 1201, if a user desires to retrieve messages left by former users of the site, then in step 1202, a list of predetermined user names with the message flag turned on in their user descriptor and the corresponding messages are retrieved from the VPN user descriptor database corresponding to the electronic site and displayed to the user. In step 1203, upon selection of the user of any of the message icons including audio, video and textual message icons, the corresponding message is output to the user. In step 1204, if the user wants to access additional messages, then in step 1205, the next predetermined number of user entries from the VPN user descriptor database with the message flag on is retrieved along with the corresponding message and output to the user.

Figure 13:
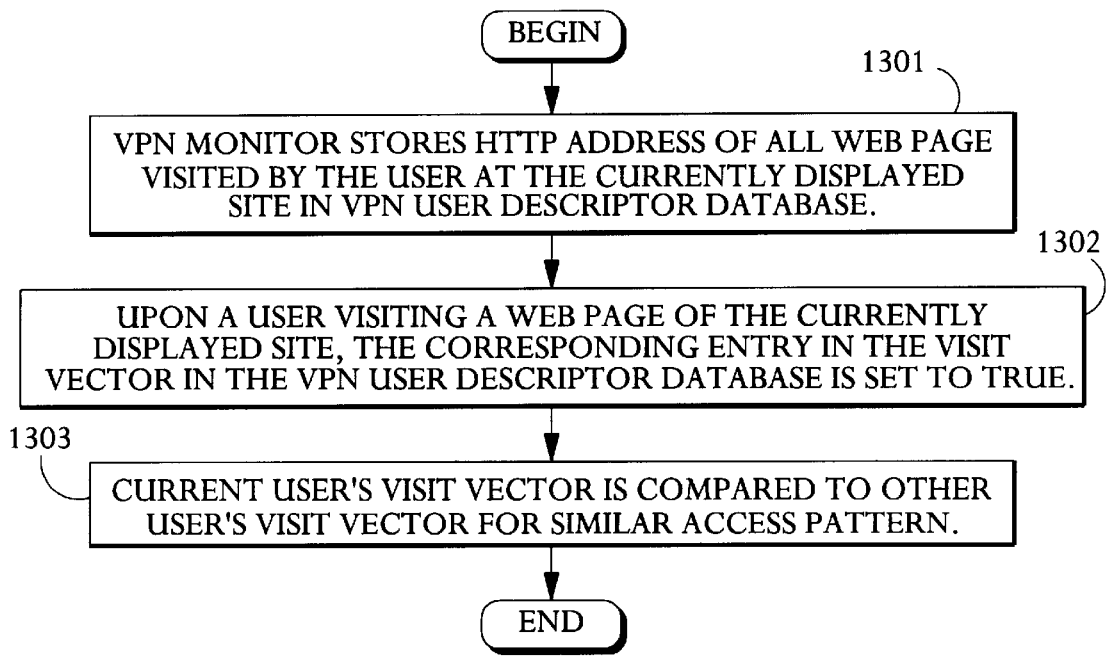
FIG. 13 is a flow diagram illustrating the general steps followed by VPN monitor's real time pattern collector in monitoring, collecting and recording user access information at real time for each user accessing a given electronic site.

FIG. 13 is a flow diagram illustrating the general steps of the VPN monitor's real time pattern collector in monitoring, collecting and recording user access information at real time for each user accessing a particular given electronic site. Once a user accesses an electronic site, a VPN user descriptor database is retrieved if it exists for that particular site and created if the database does not exist.

In step 1301, the VPN monitor outputs user inputs to the user descriptor database. The VPN user descriptor database stores the designations of each web page visited. More specifically, the VPN user descriptor database has a "visit vector" with entries in the vector corresponding to each web page visited by the user. The visit vector has an entry for each web page on the site with all the entries initially reset to "false". In step 1302, upon a user visiting a page, the corresponding entry in the visit vector is set to true. In step 1303, the current user's visit vector may then be compared to the visit vector of other recent users to find users with similar access patterns. The comparison may be performed using a dot product that would provide the similarity strength of the two vectors.

In addition to storing and comparing web pages visited, other access patterns such as inputs made to the site, scrolling pattern, use of hot links, etc. may be monitored and recorded in a similar manner.

Figure 14:
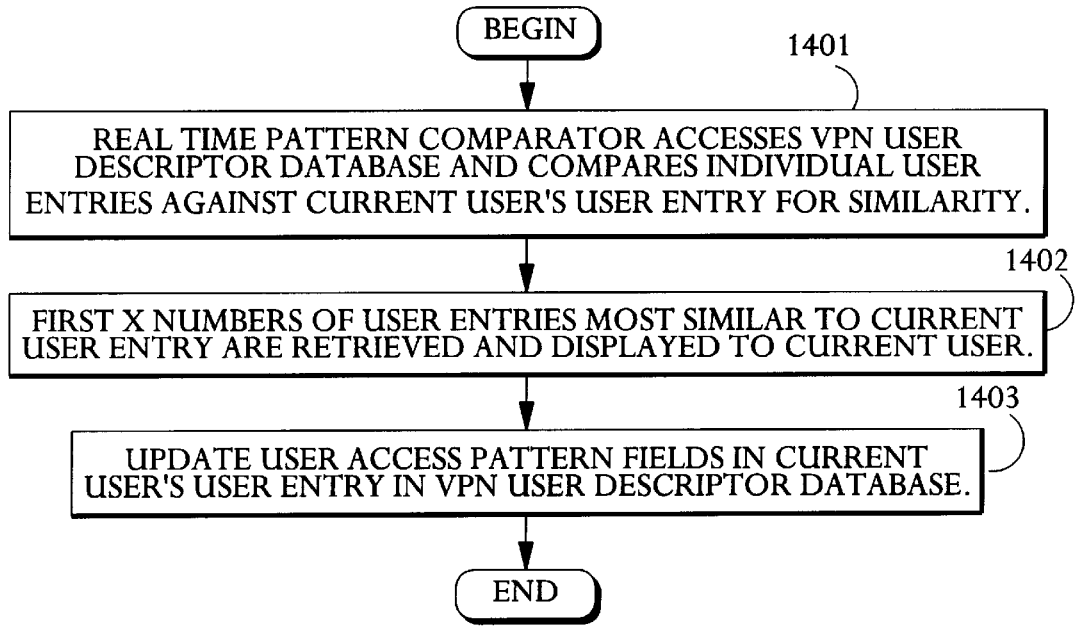
FIG. 14 is a flow diagram illustrating the general steps followed by the VPN selector's real time pattern comparator and frequency monitor.

FIG. 14 is a flow diagram illustrating the general steps followed by the VPN selector's real time pattern comparator and frequency monitor. In step 1401, the real time pattern comparator looks up the entries in the VPN user descriptor database and compares every field for each entry such as scroll count, input content, hot links selection and icon selection. Each field of a given user entry is compared to the current user's user entry. In step 1402, the real time pattern comparator takes the first predetermined number of entries with the most similar access pattern as that of the requesting user and display to current user. Additionally, the frequency monitor monitors the number of times the particular site was accessed by an individual user and this information is stored in a field that is also used in determining similarity of access pattern. In step 1404, the real time pattern collector of the VPN monitor updates the user descriptor entry in the VPN user descriptor database each time a single action is performed by a user at the electronic site.

What has been described is a method and an apparatus for virtual people networking through an electronic intra-organizational network interconnecting computer systems capable of acting as both a client system as well as a server system for providing electronic sites accessible from any one of the computer systems. The present invention's virtual people networking allows multiple people working for the an organization with similar interests to automatically interface with each other when any one of the people accesses any given one of multiple electronic sites provided through the organizational intranet. A virtual people networking (VPN) module of the present invention is capable of residing in a storage element coupled to a processor running the VPN module in any one of the multiple systems interconnected within the electronic intra-organizational network. The VPN modules may also reside in a storage element coupled to a processor running the VPN module in a firewall system acting as a gateway between the organizational intranet and the Internet providing access to the World Wide Web (WWW).

While certain exemplary embodiments have been described in detail and shown in the accompanying drawings, it is to be understood that such embodiments are merely illustrative of and not restrictive on the broad invention, and that this invention is not to be limited to the specific arrangements and constructions shown and described, since various other modifications may occur to those with ordinary skill in the art.

What is claimed:

1. A method for virtual people networking (VPN) comprising the steps of:

monitoring and recording real-time access pattern of a given one of a plurality of electronic subscribers accessing a given one of a plurality electronic sites in an Internet; and selecting a plurality of entries corresponding to a present or preceding plurality of electronic subscribers, said selecting being performed in a VPN user descriptor database having said real-time access pattern, said VPN user descriptor database having a plurality of VON user descriptors corresponding to a given one of said plurality of electronic subscribers accessing the same said given one of said plurality of electronic sites, said real-time access pattern being provided to said present or a subsequent one of said plurality of electronic subscribers upon request.

2. The method of claim 1 further comprising the step of initiating said virtual people networking (VPN) in response to a consent by a given one of said plurality of electronic subscribers.

3. The method of claim 1 wherein said VPN user descriptor database comprises a plurality of individual VPN user descriptor entries describing subscriber identification information.

4. The method of claim 1 wherein said step of updating is performed by a VPN monitor monitoring and recording said real time access pattern as said subscriber site access history.

5. The method of claim 2 further comprising the step of storing rating of said given one of said plurality of electronic sites from said plurality of electronic subscribers.

6. The method of claim 2 further comprising the step of storing a message from said present one of said plurality of electronic subscribers to subsequent viewer of said given one of said plurality of electronic sites.

7. The method of claim 2 further comprising the step of enabling a hyperlink from said given one of a plurality of electronic sites to said plurality of electronic subscribers' files.

8. The method of claim 6 further comprising the step of storing said message in the corresponding VPN user descriptor entry in said VPN user descriptor database corresponding to said given one of said plurality of electronic sites.

9. An apparatus comprising:

a virtual people networking (VPN) monitor monitoring and recording real-time access pattern of a present and a preceding electronic subscribers accessing a given one of a plurality of electronic sites in an Internet, said real-time access pattern being recorded as subscriber site access history; and a VPN user descriptor database which contains subscriber site access history of said present and said preceding electronic subscribers presently or subsequently accessing said same given one of said electronic sites, a corresponding said subscriber information being provided to said present and said preceding electronic subscribers upon request, said subscriber site access history received from said VPN monitored coupled to said VPN user descriptor.

10. The apparatus of claim 9 wherein said VPN monitor further comprises a user information collector for collecting any one of said plurality of electronic subscribers' user descriptor information.

11. The apparatus of claim 9 wherein said VPN monitor further comprises a real time pattern collector for updating said VPN user descriptor database of said given one of a plurality of electronic sites.

12. The apparatus of claim 9 further comprising a VPN selector for selecting an entry from said VPN user descriptor database which has similar subscriber site access history as said present one of said plurality of electronic subscribers requesting such information for said given one of a plurality of electronic sites.

13. The apparatus of claim 9 further comprising a VPN related site database comprising the addresses of related sites as provided by said given one of said plurality of electronic subscribers at said given one of said plurality of electronic sites.

14. The apparatus of claim 12 further comprising a real-time pattern comparator for comparing each entry in said VPN user descriptor database against the site access pattern history of said present electronic subscribers requesting the information and retrieving the entry which is most similar to the subscriber site access history of the requesting said present one of plurality of electronic subscribers.

15. The apparatus of claim 12 wherein said VPN selector further comprises a frequency monitor for monitoring the frequency with which each said given one of plurality of electronic subscribers access a given one of plurality of electronic sites.

16. A system comprising:
a plurality of nodes capable of being a server providing a plurality of electronic sites for dissemination of associated information to any one of the plurality of nodes and a client accessing said disseminated information;
a storage element residing in any one of said plurality of nodes which contains,
a VPN monitor monitoring and recording real-time access pattern of a present and a preceding electronic subscribers accessing a given one of said plurality of electronic sites, and
a VPN user descriptor database which contains subscriber site access history of said present and said preceding electronic subscribers presently or subsequently accessing said same given one of said electronic sites, a corresponding said subscriber information being provided to said present and said preceding electronic subscribers upon request, said subscriber site access history received from said VPN monitored coupled to said VPN user descriptor, said VPN user descriptor database coupled to said VPN monitor; and
a processor coupled to said storage element and residing in a corresponding said any one of said plurality of nodes, said processor driving said VPN monitor.

17. The system of claim 16 wherein said VPN monitor further comprises a user information collector for collecting from any one of said plurality of electronic subscribers' user descriptor information.

18. The system of claim 16 wherein said VPN monitor further comprises a real-time pattern collector for updating said VPN user descriptor database of said given one of a plurality of electronic sites.

19. The system of claim 16 further comprising a VPN selector for selecting an entry from said VPN user descriptor database which has similar subscriber site access history as said present electronic subscribers requesting such information for said given one of a plurality of electronic sites.

20. The system of claim 16 further comprising a VPN related site database comprising the addresses of related sites as provided by said given one of plurality of electronic subscribers at said given one of plurality of electronic sites.

21. The system of claim 19 further comprising a real-time pattern comparator for comparing each entry in said VPN user descriptor database against the site access pattern history of said present electronic subscribers requesting the information and retrieving the entry which is most similar to the subscriber site access history of the requesting said present electronic subscribers.

22. The system of claim 19 wherein said VPN selector further comprises a frequency monitor for monitoring the frequency with which each said given one of plurality of electronic subscribers access a given one of plurality of electronic sites.

23. An apparatus comprising:
means for monitoring and recording real-time access pattern of said given one of a plurality of electronic subscribers accessing a given one of a plurality of electronic sites in an Internet; and
a VPN user descriptor database which contains subscriber site access history indicative of frequent and similar access pattern as present and subsequent one of said plurality of electronic subscribers presently or subsequently accessing said same given one of said electronic sites, a corresponding said subscriber information being provided to said present and subsequent one of said plurality of electronic subscribers upon request, said VPN user descriptor database coupled to said means for monitoring.

24. The apparatus of claim 23 wherein said means for monitoring further comprises a means for collecting user descriptor information of said given one of said plurality of electronic subscribers.

25. The apparatus of claim 23 wherein said means for monitoring further comprises a means for updating said VPN user descriptor database of said given one of a plurality of electronic sites.

26. The apparatus of claim 23 further comprising a means for selecting an entry from said VPN user descriptor database which has similar subscriber site access history as said present one of plurality of electronic subscribers requesting such information for said given one of a plurality of electronic sites.

27. The apparatus of claim 23 further comprising a VPN related site database comprising the addresses of related sites as provided by said given one of plurality of electronic subscribers at said given one of plurality of electronic sites.

28. The apparatus of claim 26 further comprising a means for comparing each entry in said VPN user descriptor database against the site access pattern history of said present one of plurality of electronic subscribers requesting the information and retrieving the entry which is most similar to the subscriber site access history of the requesting said present one of plurality of electronic subscribers.

29. The apparatus of claim 26 wherein said means for selecting further comprises a frequency monitor for monitoring the frequency with which each said given one of plurality of electronic subscribers access a given one of plurality of electronic sites.

30. A system comprising:
a plurality of nodes capable of being a server providing a plurality of electronic sites for dissemination of associated information to any one of the plurality of nodes and a client accessing said disseminated information;

means for storing residing in any one of said plurality of nodes which contains,
  means for monitoring and recording real-time access pattern of said given one of a plurality of electronic subscribers accessing a given one of said plurality of electronic sites, and
  a VPN user descriptor database storing said subscriber site access history including subscriber site access history indicative of frequent and similar access pattern as said present and subsequent one of said plurality of electronic subscribers presently or subsequently accessing said same given one of said electronic sites, a corresponding said subscriber information being provided to said present and subsequent one of said plurality of electronic subscribers upon request, said VPN user descriptor database coupled to said means for monitoring; and
means for processing coupled to said means for storing and residing in a corresponding said any one of said plurality of nodes, said means for processing driving said means for monitoring.

31. The system of claim 30 wherein said means for monitoring further comprises a means for collecting user descriptor information of said given one of said plurality of electronic subscribers.

32. The system of claim 30 wherein said means for monitoring further comprises a means for updating said VPN user descriptor database of said given one of a plurality of electronic sites.

33. The system of claim 30 further comprising a means for selecting an entry from said VPN user descriptor database which has similar subscriber site access history as said present one of plurality of electronic subscribers requesting such information for said given one of a plurality of electronic sites.

34. The system of claim 30 further comprising a means for VPN related site database comprising the addresses of related sites as provided by said given one of plurality of electronic subscribers at said given one of plurality of electronic sites.

35. The system of claim 33 further comprising a means for comparing each entry in said VPN user descriptor database against the site access pattern history of said present one of plurality of electronic subscribers requesting the information and retrieving the entry which is most similar to the subscriber site access history of the requesting said present one of plurality of electronic subscribers.

36. The system of claim 33 wherein said means for selecting further comprises a frequency monitor for monitoring the frequency with which each said given one of plurality of electronic subscribers access a given one of plurality of electronic sites.

* * * * *